United States Patent
Nicol et al.

(10) Patent No.: US 9,952,772 B2
(45) Date of Patent: Apr. 24, 2018

(54) COMPRESSION-BASED DETECTION OF INEFFICIENCY IN LOCAL STORAGE

(71) Applicant: LinkedIn Corporation, Mountain View, CA (US)

(72) Inventors: John W. Nicol, San Jose, CA (US); Ritesh Maheshwari, Mountain View, CA (US); Nicholas P. Baggott, Mountain View, CA (US); Haricharan K. Ramachandra, Fremont, CA (US); Badrinath K. Sridharan, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 15/160,898

(22) Filed: May 20, 2016

(65) Prior Publication Data

US 2017/0336984 A1 Nov. 23, 2017

(51) Int. Cl.
*G06F 3/06* (2006.01)
*G06F 12/02* (2006.01)
*G06F 11/14* (2006.01)

(52) U.S. Cl.
CPC .......... *G06F 3/0608* (2013.01); *G06F 3/062* (2013.01); *G06F 3/0661* (2013.01); *G06F 3/0673* (2013.01); *G06F 11/1446* (2013.01); *G06F 12/023* (2013.01)

(58) Field of Classification Search
CPC .... G06F 3/0608; G06F 3/0635; G06F 12/023; G06F 11/1446
See application file for complete search history.

(56) References Cited

U.S. PATENT DOCUMENTS

| 7,779,054 | B1 | 8/2010 | Printezis |
| 9,715,346 | B2* | 7/2017 | Jain ................ G06F 3/0619 |
| 2014/0064479 | A1 | 3/2014 | Manikandan |
| 2014/0279874 | A1 | 9/2014 | Reiter |
| 2016/0224424 | A1* | 8/2016 | Kahler ............ G06F 11/1096 |
| 2017/0003899 | A1* | 1/2017 | Raja ................ G06F 3/0619 |

OTHER PUBLICATIONS

Memory Analyzer (MAT), Copyright 2016 the Eclipse Foundation, https://eclipse.org/mat/.
"In-depth .NET Memory Profiling", Copyright 2001-2016 SciTech Software AB, http://memprofiler.com.
Jennifer B. Sartor et al., "No Bit Left Behind: The Limits of Heap Data Compression", ISMM'08, Jun. 7-8, Tucson, AZ, Copyright 2008 ACM.

* cited by examiner

*Primary Examiner* — Hal Schnee
(74) *Attorney, Agent, or Firm* — Park, Vaughan, Fleming & Dowler LLP; Chia-Hsin Suen (57) ABSTRACT

The disclosed embodiments provide a system for detecting and managing inefficiency in local storage. During operation, the system obtains a first snapshot of data in local storage of a computer system, wherein the first snapshot comprises a first set of data elements in the local storage at a first time. Next, the system applies a compression technique to the first snapshot to obtain a first set of inefficiency metrics for the first set of data elements. The system then outputs the first set of inefficiency metrics with additional attributes of the data to improve management of inefficiency in the data.

20 Claims, 9 Drawing Sheets

COMPRESSION-BASED DETECTION OF INEFFICIENCY IN LOCAL STORAGE

RELATED APPLICATION

The subject matter of this application is related to the subject matter in a co-pending non-provisional application by the same inventors as the instant application and filed on the same day as the instant application, entitled "Compression-Based Detection of Inefficiency in External Services," having Ser. No. 15/160,905, and filing date 20 May 2016.

BACKGROUND

Field

The disclosed embodiments relate to reducing inefficiency in computer systems. More specifically, the disclosed embodiments relate to techniques for performing compression-based detection of inefficiency in local storage of computer systems.

Related Art

Inefficiencies in services related to computer networking, local storage, bus interfaces, input/output (I/O), and/or other digital communications or storage may result in the use of more resources than necessary to accomplish a task without producing a substantial difference in the performance associated with completing the task. For example, data fragmentation in a data storage device of a computer system may reduce the throughput of the storage device and/or interfere with efficient use of space in the storage device. Similarly, encrypted data that is found to be redundant may be both larger in size and more vulnerable to attack than data that is compressed before encryption.

Consequently, the use of such services may be improved by mechanisms for detecting and managing inefficiencies in the storage or transmission of data in computer systems.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Detection of Memory Inefficiency in Software Programs

Figure 1:
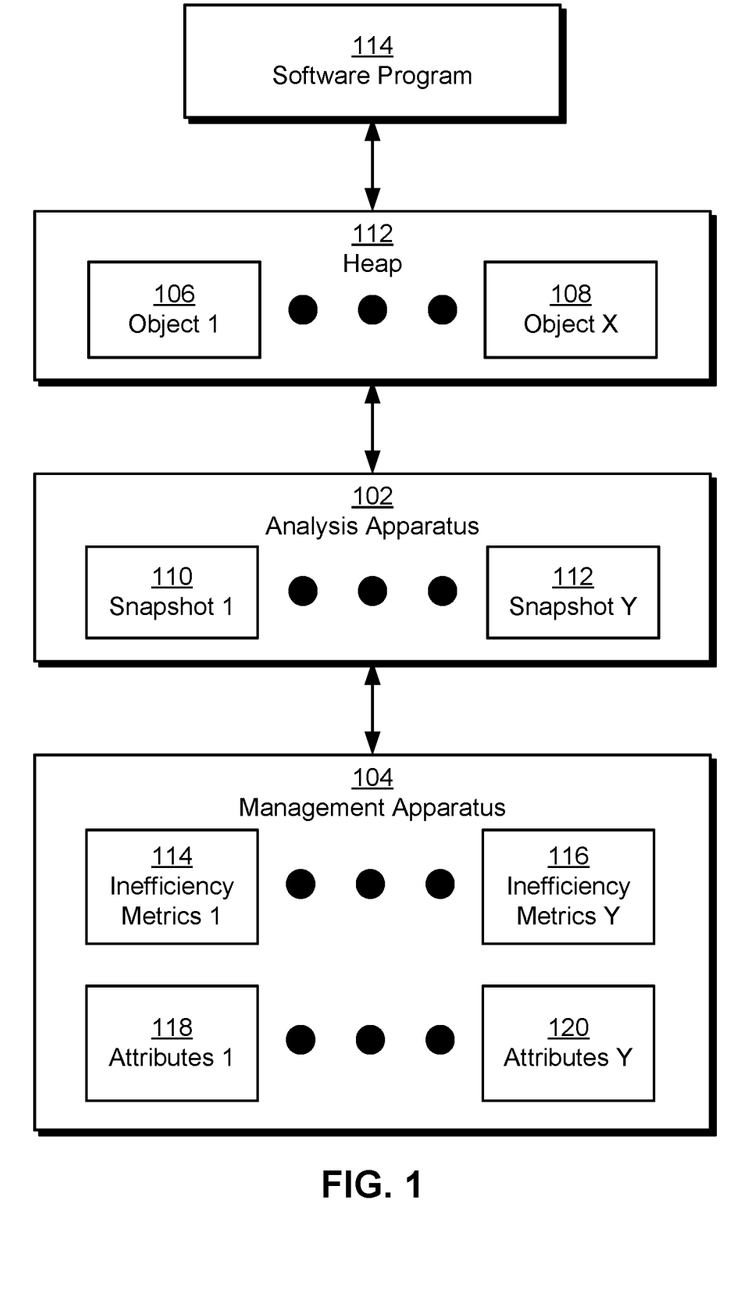
FIG. 1 shows a schematic of a system in accordance with the disclosed embodiments.

The disclosed embodiments provide a method, apparatus, and system for detecting and managing memory inefficiency in software programs. As shown in FIG. 1, a software program 114 may execute using memory from a heap 112. For example, software program 114 may be an operating system, virtual machine, database, middleware, native application, web application, and/or other type of software that executes using objects (e.g., object 1 106, object x 108) of arbitrary size and length. Memory for new objects may be allocated from heap 112 by a memory allocator, and memory from unused objects in heap 112 may be reclaimed by a garbage collector.

Those skilled in the art will appreciate that dynamic memory allocation from heap 112 to software program 114 may be associated with significant memory inefficiency and/or memory issues for a number of programming languages that are designed for ease of use instead of memory efficiency. The memory issues may include memory bloat, in which excessive memory is allocated but not freed in heap 112. For example, memory bloat may be caused by the allocation of space for more elements in data structures such as ArrayLists and hash maps than is used by the data structures, as well as significant increases (e.g., 150-200%) in the size of the data structures to accommodate growth in the number of elements beyond previously allocated sizes. In another example, memory bloat may be caused by the wrapping of primitive types such as integers and strings in class-based objects that are multiple times larger than the primitive types, such as Integers.

The memory issues may also include memory churn, in which excessive memory is regularly allocated and freed from heap 112. For example, memory churn may be caused by alternating between allocation and use of a large number of objects in heap 112 and deallocation and garbage collection of those objects. Such repeated allocation and deallocation of large amounts of memory may trigger multiple garbage-collection cycles and slow the execution of software program 114.

The memory inefficiency may further include a memory leak, in which incremental amounts of memory are allocated but not freed. For example, a memory leak may be caused by an increase in the number of objects in heap 112 that are reachable but unused and/or the expansion of array-based data structures by a multiple of their previous size. A memory leak that is not resolved may further lead to an out-of-memory (OOM) error and/or failure in software program 114.

At the same time, a developer of software program 114 may have difficulty detecting memory inefficiency in software program 114 and/or identifying sources of the memory inefficiency. For example, the developer may use a memory visualizer to view the structure and/or organization of objects in heap 112. However, the memory visualizer may be unable to provide information that can be used to identify objects that are inefficiently using memory and/or may be unable to track changes in the memory usage of software program 114 over time.

In one or more embodiments, the system of FIG. 1 includes functionality to detect and manage memory inefficiency in software program 114. First, an analysis apparatus 102 may obtain a series of snapshots (e.g., snapshot 1 110, snapshot y 112) of heap 112. Each snapshot may include a set of objects from software program 114 that are stored in heap 112 at a given time. For example, analysis apparatus 102 may obtain the snapshot at periodic intervals and/or after certain events (e.g., garbage collection cycles, memory allocation, etc.) have occurred in a tool, garbage collector, and/or execution environment for software program 114.

Next, analysis apparatus 102 may use one or more compression techniques to generate a set of inefficiency metrics (e.g., inefficiency metrics 1 114, inefficiency metrics y 116) for objects in each snapshot. For example, analysis apparatus 102 may compress one or more portions of the snapshot using Huffman coding, Lempel-Ziv, arithmetic coding, bzip2, another compression technique, and/or a combination of compression techniques. The portions may include the entire snapshot, individual objects in the snapshot, and/or groupings of objects in the snapshot. After a portion is compressed, analysis apparatus 102 may generate an inefficiency metric representing the redundancy, compression ratio, and/or other measure of memory inefficiency in the portion from the compressed and uncompressed sizes of the portion. As a result, the inefficiency metric may be an indication and/or upper bound of the amount of memory that can be saved through more efficient implementation or use of objects in the portion.

After the inefficiency metrics are generated for a given snapshot, a management apparatus 104 may output the inefficiency metrics with additional attributes (e.g., attributes 1 118, attributes y 120) of the corresponding portions to improve identification of memory inefficiency in software program 114. For example, management apparatus 104 may display a ranking of objects in the snapshot by decreasing order of memory inefficiency, as determined using the inefficiency metrics. Management apparatus 104 may also display the class names, uncompressed sizes, compressed sizes, numbers of instances, fields, types, and/or values associated with objects or portions of the snapshot in the ranking. Management apparatus 104 may further identify a subset of objects in the snapshot as candidates for improving memory inefficiency in software program 114.

Analysis apparatus 102 and management apparatus 104 may additionally include functionality to analyze and manage memory-usage trends, patterns, and/or issues in software program 114. As described in further detail below with respect to FIG. 2, such analysis may be performed by comparing inefficiency metrics across snapshots, matching the snapshots and inefficiency metrics to the memory-usage patterns, and/or using the inefficiency metrics to match objects in one snapshot with objects in another snapshot. In turn, analysis apparatus 102 and management apparatus 104 may identify memory leaks, OOM errors, and/or other memory issues associated with the trends; identify potential causes of the trends and/or issues; and/or generate recommendations for reducing memory inefficiency in software program 114 based on the memory-usage patterns. Consequently, the system of FIG. 1 may automatically detect memory inefficiencies, identify the sources of the memory inefficiencies, determine potential causes of memory issues, and suggest or implement mechanisms for mitigating the memory inefficiencies and/or issues.

Figure 2:
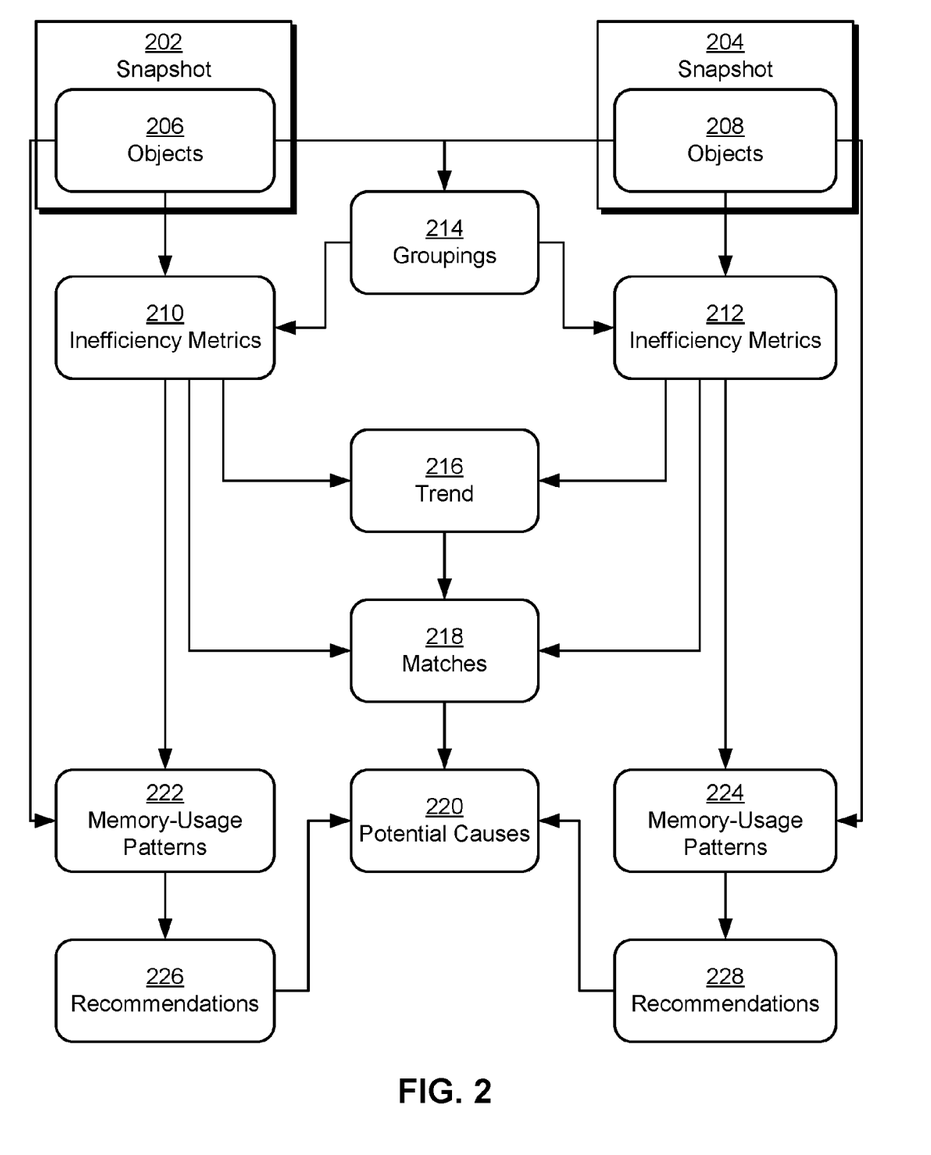
FIG. 2 shows the detection and management of memory inefficiency in a software program in accordance with the disclosed embodiments.

FIG. 2 shows the detection and management of memory inefficiency in a software program (e.g., software program 114 of FIG. 1) in accordance with the disclosed embodiments. The operations illustrated in FIG. 2 may be performed by one or more components of a memory-management system, such as analysis apparatus 102 and/or management apparatus 104 of FIG. 1.

As shown in FIG. 2, memory inefficiency in the software program may be detected by analyzing snapshots 202-204 of a heap for the software program, such as heap 112 of FIG. 1. Each snapshot 202-204 may include a set of objects 206-208 that are stored in the heap at a given time. For example, snapshot 202 may include a first set of objects 206 that are found in the heap at a first time, and snapshot 204 may include a second set of objects 208 that are found in the heap at a second, later time.

A set of inefficiency metrics 210-212 may be generated from each snapshot 202-204 after the snapshot is created. Inefficiency metrics 210-212 may represent measures of memory inefficiency in the corresponding objects 206-208. To generate inefficiency metrics 210-212, each object may be compressed using one or more compression techniques, and the corresponding inefficiency metric may be calculated as a redundancy, compression ratio, and/or other value from the compressed and uncompressed sizes of the object.

Some inefficiency metrics 210-212 may be produced for one or more groupings 214 of objects 206-208 in each snapshot 202-204. Groupings 214 may be generated based on attributes of objects 206-208 and/or snapshots 202-204. For example, groupings 214 may include all objects 206-208 in a given snapshot, objects of a certain type, objects that match a certain containment relationship (e.g., all objects that are contained by the same object and/or all objects at the same level of a containment hierarchy for the software program), and/or objects of a certain size or range of sizes.

To calculate an inefficiency metric for a given grouping of objects, all objects in the grouping may be aggregated and compressed, and the inefficiency metric may be calculated from the compressed and uncompressed sizes of the aggregated objects. For example, a redundancy of all Integer objects in snapshot 202 may be calculated by summing the uncompressed sizes of the Integer objects, compressing the entire set of Integer objects, and dividing the compressed size of the set of Integer objects by the sum of the uncompressed sizes.

After inefficiency metrics 210-212 are calculated for objects 206-208 and groupings 214 in snapshots 202-204, the inefficiency metrics may be outputted with additional attributes of the corresponding objects and/or groupings. For example, the objects and/or groupings may be ranked in descending order of redundancy. Each item in the ranking may also be displayed with attributes such as one or more class names, a number of object instances, a compressed size, and/or an uncompressed size of the item. The item may also be displayed with field names, field types, and/or field values of fields in the item to enable identification of subsets and/or groupings 214 of objects 206-208 that may contribute to memory inefficiency in the software program. A number of items in the ranking (e.g., a pre-specified number of items with the highest inefficiency metrics and/or all items with inefficiency metrics that are higher than a threshold) may additionally be flagged as candidates for improving memory inefficiency in the software program.

Objects 206-208 and inefficiency metrics 210 for each snapshot 202-204 may also be matched to one or more memory-usage patterns 222-224, and recommendations 226-228 for reducing the memory inefficiency of the software program may be outputted based on the memory-usage patterns. For example, a high redundancy of an object and a type of the object (e.g., ArrayList of Integers) may be matched to a memory-usage pattern that indicates inefficient use of memory that is caused by one or more types from which the object is instantiated. In turn, a recommendation for reducing the object's memory usage may include changing the type(s) used to instantiate the object to primitive types and/or more efficient data structures.

Inefficiency metrics 210-212 generated from snapshots 202-204 may also be compared to identify a trend 216 associated with memory usage in the heap. For example, inefficiency metrics 210-212 for different snapshots 202-204 of the heap may be used to identify changes in memory usage and/or memory inefficiency for specific objects 206-208, groupings 214 of objects, and/or other portions of the heap over time. A developer may also use comparisons of inefficiency metrics 210-212 to determine if memory inefficiency in the software program is increasing over time and/or if implementation of actions in recommendations 226 or 228 has improved the memory usage of the software program.

Changes in inefficiency metrics 210-212 and/or associated values (e.g., compressed and uncompressed sizes) across a series of snapshots, or trend 216, may further be used to detect memory issues such as memory bloat, memory churn, and/or a memory leak. For example, memory bloat may be detected as a sustained inefficient use of memory in the heap, as represented by a sequence of high values of redundancy (e.g., more than 80%) in inefficiency metrics 210-212. Memory churn may be detected as cyclical increases and decreases in the memory usage and/or memory inefficiency of the software program, as represented by fluctuating values of heap size and/or inefficiency metrics 210-212 over time. A memory leak may be detected as a sequence of gradual increases in memory usage and/or memory inefficiency, as represented by corresponding increases in heap size and/or inefficiency metrics 210-212 over time.

To identify a potential cause of trend 216 and/or memory issues represented by trend 216, inefficiency metrics 210-212 may be used to identify matches 218 between objects 206-208 in consecutive snapshots 202-204, and matches 218 may be used to identify one or more potential causes 220. More specifically, inefficiency metrics 210-212 may serve as "compression signatures" for the corresponding objects 206-208 or groupings 214 of objects. As a result, objects with similar compression signatures (e.g., values of inefficiency metrics 210-212) may be instantiated from the same class and/or from different classes with similar memory-usage patterns (e.g., memory-usage patterns 222-224). The compression signatures may be tracked and compared across snapshots 202-204 to determine the "contribution" of different types of objects to the overall redundancy or memory usage of the heap. In turn, objects with compression signatures that approach and/or track the compression signature of the heap may be identified as potential causes 220 of trend 216 and/or memory issues represented by trend 216.

For example, snapshot 204 may be taken after an OOM error is encountered by the software program, and snapshot 202 may be taken prior to snapshot 204. Inefficiency metrics 210 for snapshot 202 may indicate a redundancy of 60% for the heap, a few hundred objects with 66% redundancy, and a number of other objects with other redundancies. Inefficiency metrics 212 for snapshot 204 may indicate a redundancy of close to 66% for the heap, a few hundred thousand objects with 66% redundancy, and a much smaller number of objects with other redundancies. Because the final redundancy of the heap at snapshot 204 is highly similar to the redundancy of a majority of objects in snapshot 204, some or all of the objects with similar redundancies to the heap may be identified with a large measure of confidence as potential causes of the OOM error. Moreover, a rapid growth in the number of objects with 66% redundancy between snapshots 202-204 may indicate that replication of objects with "compression signatures" represented by 66% redundancy is likely responsible for a memory leak that caused the OOM error.

As with inefficiency metrics 210-212 and recommendations 226-228, trend 216, matches 218, and/or potential cause 220 may be outputted to improve identification and/or management of memory inefficiency in the software program. For example, an indication of an upward trend 216 in memory consumption and inefficiency may be displayed with a list of objects with inefficiency metrics 210-212 that track trend 216 and are thus potential causes of trend 216. A developer may use the list and/or one or more recommendations 226-228 associated with objects in the list to refractor the software program in a way that reduces the memory consumption and inefficiency. In turn, the developer may resolve and/or avert a memory issue represented by trend 216, such as memory bloat and/or a memory leak in the software program.

Figure 3:
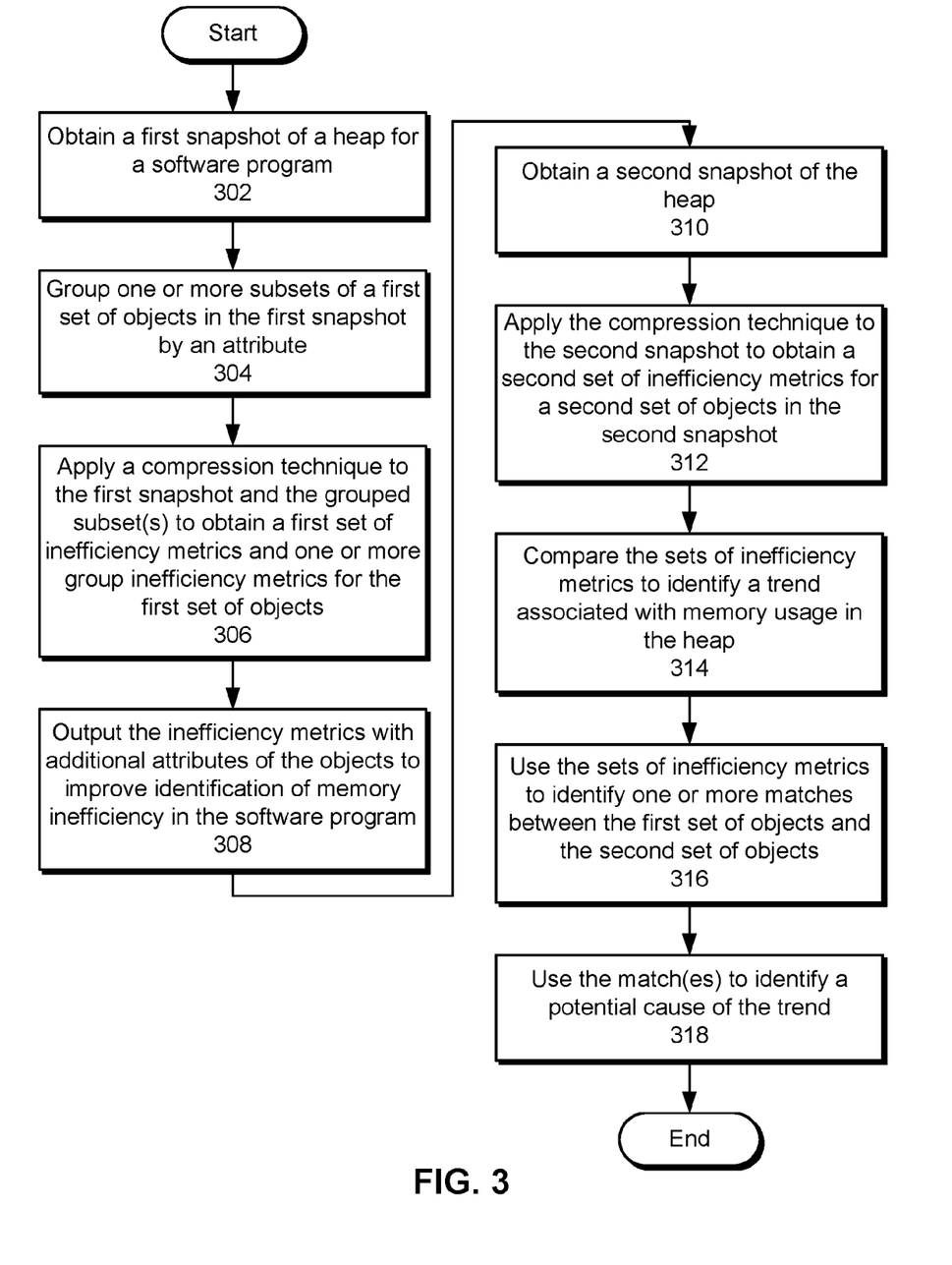
FIG. 3 shows a flowchart illustrating the process of detecting memory inefficiency in a software program in accordance with the disclosed embodiments.

FIG. 3 shows a flowchart illustrating the process of detecting memory inefficiency in a software program in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a first snapshot of a heap for a software program is obtained (operation 302). For example, the first snapshot may be obtained from a tool, execution environment, and/or garbage collector for the software program. The first snapshot may be obtained after an event has occurred during execution of the software program, or the first snapshot may be obtained after a fixed interval has passed since the previous snapshot.

Next, one or more subsets of a first set of objects in the first snapshot are grouped by an attribute (operation 304). For example, the subset(s) may be grouped by a type, such as the class from which the objects were instantiated. The subset(s) may also be grouped by a containment relationship, such as all objects indirectly or directly contained within a parent object and/or all objects in a given level of a containment hierarchy (e.g., all objects declared as fields under a parent object) for the software program. The subset(s) may further be grouped by the sizes and/or ranges of sizes of objects in the snapshot.

A compression technique is then applied to the first snapshot and the grouped subset(s) to obtain a first set of inefficiency metrics and possibly one or more group inefficiency metrics for the first set of objects (operation 306). For example, the compression technique may be used to compress individual objects, groups of objects, portions of the heap, and/or the entire heap. The corresponding inefficiency metrics may be calculated by dividing the compressed sizes of the objects, groups, portions, and/or heap by the uncompressed sizes. As a result, the inefficiency metrics may represent redundancies of various subsets of the heap.

The calculated inefficiency metrics may also be used to perform one or more additional groupings of the objects, which in turn are used to calculate additional group inefficiency metrics. For example, one or more subsets of the objects may be grouped by values and/or ranges of values of the inefficiency metric, and additional group inefficiency metrics may be calculated for the grouped subsets. The group inefficiency metrics may provide an indication of the amount of "duplication" in the grouped objects, in that a grouped inefficiency metric that is similar to individual inefficiency metrics of objects in the corresponding group may indicate that objects in the group and/or classes used to instantiate the objects have similar memory-usage patterns.

The calculated inefficiency metrics are outputted with additional attributes of the objects to improve identification of memory inefficiency in the software program (operation 308). For example, a ranking of the first set of objects and/or groupings may be displayed in decreasing order of memory inefficiency, along with class name, uncompressed sizes, compressed sizes, numbers of object instances, fields, types, and/or values associated with the corresponding objects or groupings. A subset of the first set of objects as candidates for improving memory inefficiency may also be identified and/or flagged within the ranking. The ranking may also be sorted by the other attributes, searched for keyword matches, and/or filtered.

A second snapshot of the heap is also obtained (operation 310) sometime after the first snapshot. For example, the second snapshot may be obtained at a fixed interval after the first snapshot, or the second snapshot may be triggered by an event that occurs after the first snapshot.

Next, the compression technique is applied to the second snapshot to obtain a second set of inefficiency metrics for a second set of objects in the second snapshot (operation 312). As with generation of the first set of efficiency metrics, the second set of inefficiency metrics may include one or more group inefficiency metrics for one or more groupings of the second set of objects by type, containment relationship, size, inefficiency metric, and/or another attribute.

The two sets of inefficiency metrics are then compared to identify a trend associated with memory usage in the heap (operation 314). For example, the two sets of inefficiency metrics may be used to analyze patterns in the overall memory usage of the heap, as well as subsets of objects that may contribute to the patterns.

The two sets of inefficiency metrics are also used to identify one or more matches between the first and second sets of objects (operation 316), and the match(es) are used to identify a potential cause of the trend (operation 318). For example, inefficiency metrics in the first set of objects may be matched to similar inefficiency metrics in the second set of objects, and a change in the overall inefficiency metric for the heap may be analyzed with respect to the matched objects. In turn, changes in the numbers of objects with inefficiency metrics that track the overall inefficiency metric may be used to identify objects that are likely to contribute to a memory issue represented by the change in the overall inefficiency metric.

Figure 4:
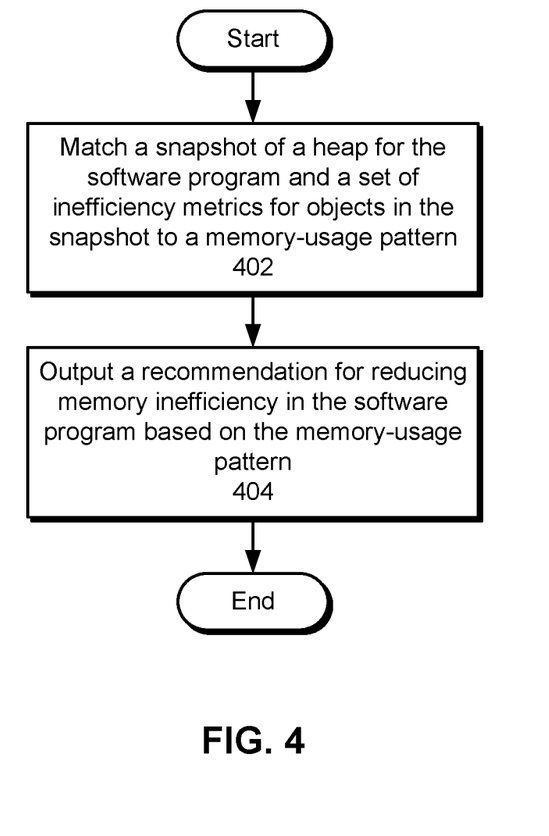
FIG. 4 shows a flowchart illustrating the process of managing memory inefficiency in a software program in accordance with the disclosed embodiments.

FIG. 4 shows a flowchart illustrating the process of managing memory inefficiency in a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a snapshot of a heap for the software program and a set of inefficiency metrics for objects in the snapshot are matched to a memory-usage pattern (operation 402). For example, the snapshot may be used to identify classes from which the objects were instantiated, and the class names and inefficiency metrics may be matched to known patterns of inefficient memory use in the software program, such as instantiation of array-backed data structures with elements that are primitive types wrapped in class-based objects.

Next, a recommendation for reducing memory inefficiency in the software program is outputted based on the memory-usage pattern (operation 404). Continuing with the above example, the recommendation may specify substitution of the class-based objects with the primitive types and use of a different data structure in lieu of the array-backed data structures. As another example, the recommendation may recommend caching of an object that is duplicated multiple times to avert redundant storage of the object in memory.

Compression-Based Detection of Other Types of Inefficiency

Figure 5:
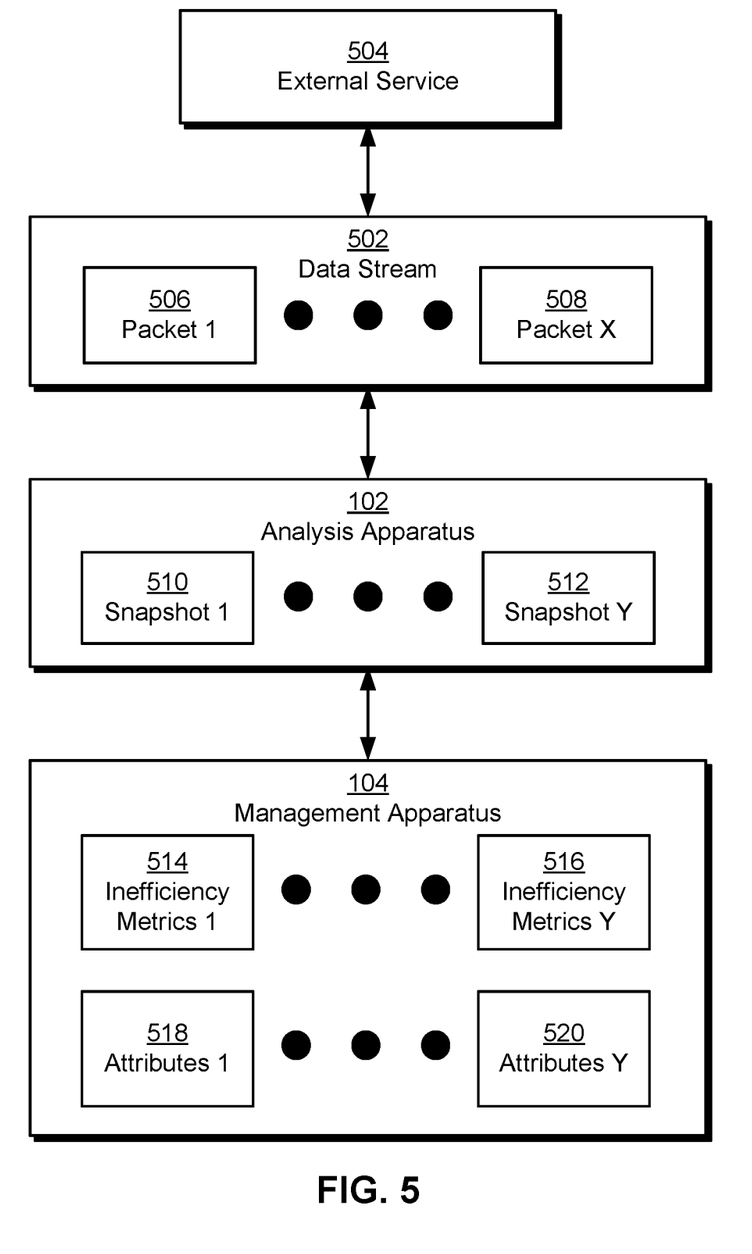
FIG. 5 shows a system for detecting inefficiencies in external services in accordance with the disclosed embodiments.

The above-described techniques for detecting inefficiency in software programs can be applied to other types of data storage and communications. As shown in FIG. 5, analysis apparatus 102 and management apparatus 104 may be configured to analyze and manage inefficiencies in an external service 504. External service 504 may include a networking service, interconnect service, and/or other service for transmitting data between electronic devices such as personal computers, laptop computers, game consoles, servers, workstations, portable electronic devices, and/or peripheral devices.

More specifically, an electronic device may use external service 504 to transmit a data stream 502 to another electronic device. The electronic device may format data in the data stream into a series of packets (e.g., packet 1 506, packet x 508) before the data is transmitted to the other electronic device. For example, packet data may be transmitted between the electronic devices over an intranet, wireless network, wired network, bus interface, the Internet, and/or other communications mechanism. In turn, the packets may represent individual data elements in data stream 502.

Analysis apparatus 102 may obtain a series of snapshots (e.g., snapshot 1 510, snapshot y 512) of data stream 502, with each snapshot containing a series of packets and/or other data elements transmitted in the data stream over a given period. For example, analysis apparatus 102 may aggregate a pre-specified number or volume of data elements into a snapshot. In another example, analysis apparatus 102 may include a series of packets transmitted over a pre-specified number of seconds or minutes into the snapshot. Analysis apparatus 102 may alternatively select the frequency with which the snapshots are generated and/or the interval over which each snapshot is created based on attributes of the data stream. For example, analysis apparatus 102 may generate snapshots of the data stream based on changes to the bit rate, number of connections, throughput, latency, error rate, network topology, and/or available capacity of the wired and/or wireless connection over which the data stream is transmitted.

Next, analysis apparatus 102 may use one or more compression techniques to generate a set of inefficiency metrics (e.g., inefficiency metrics 1 514, inefficiency metrics y 516) for packets and/or other data elements in each snapshot. As mentioned above, analysis apparatus 102 may compress entire snapshots, individual data elements in the snapshot, and/or groupings of data elements in the snapshot. For example, analysis apparatus 102 may group or filter packets or portions of packets in the snapshot by service type (e.g., protocol, application, network stack layer, etc.), data element type (e.g., packet type, packet headers, packet payloads, etc.), source or destination port, source or destination address (e.g., Internet Protocol (IP) address, Media Access Control (MAC) address, etc.), connection, and/or other attributes associated with the data stream before compressing the packets.

Analysis apparatus 102 may then calculate a redundancy, compression ratio, and/or other measure of inefficiency in the data stream from the compressed and uncompressed sizes of the snapshot and/or grouped portions of the snapshot. Analysis apparatus 102 may also perform additional compression and/or analysis of the data to identify potential types, causes, and/or consequences of inefficiencies in the data stream. For example, analysis apparatus 102 may identify redundancies in encrypted data when the compression technique substantially reduces the size of the data. In turn, analysis apparatus 102 may flag the redundancies as a security risk, since such redundancies indicate the presence of patterns in the data that can be exploited by an attacker. In another example, analysis apparatus 102 may use compressed data from packet headers to identify inefficiencies in request strategy that result from repeated similar errors from a server and/or repeated requests or retries from a client. In a third example, analysis apparatus 102 may use compressed data from packet payloads to identify inefficiencies associated with redundant transmission of data schemas during reading or writing of data using the data stream.

In one or more embodiments, analysis apparatus 102 uses multiple groupings of data elements in the snapshots to analyze inefficiencies in data stream 502. For example, analysis apparatus 102 may initially compress an entire snapshot to determine the amount of redundancy in the snapshot. If the snapshot compresses beyond a pre-specified threshold, analysis apparatus 102 may compress portions of the snapshot that are grouped or filtered by connection, address, port, service, protocol, network stack layer, and/or other attributes. When one or more portions are identified as contributing significantly to the redundancy, analysis apparatus 102 may group data elements in the portions by additional attributes to identify patterns related to specific types of inefficiencies in the data stream. In other words, analysis apparatus 102 may iteratively "drill down" into smaller subsets of the data stream to identify root causes of the inefficiencies.

After the inefficiencies are identified and/or analyzed, management apparatus 104 may output the inefficiency metrics with additional attributes (e.g., attributes 1 518, attributes y 520) of data stream 502. For example, management apparatus 104 may display a ranking of data elements and/or groupings of data elements in the snapshot by decreasing order of inefficiency, as determined using the inefficiency metrics. Management apparatus 104 may also display attributes associated with items in the ranking, such as the values by which the data elements were grouped or filtered to generate the inefficiency metrics. Management apparatus 104 may further display the types of inefficiencies (e.g., security flaws, request strategy inefficiencies, schema inefficiencies, etc.) found in the data stream to facilitate improvement of the inefficiencies by developers or administrators associated with the data stream.

Figure 6:
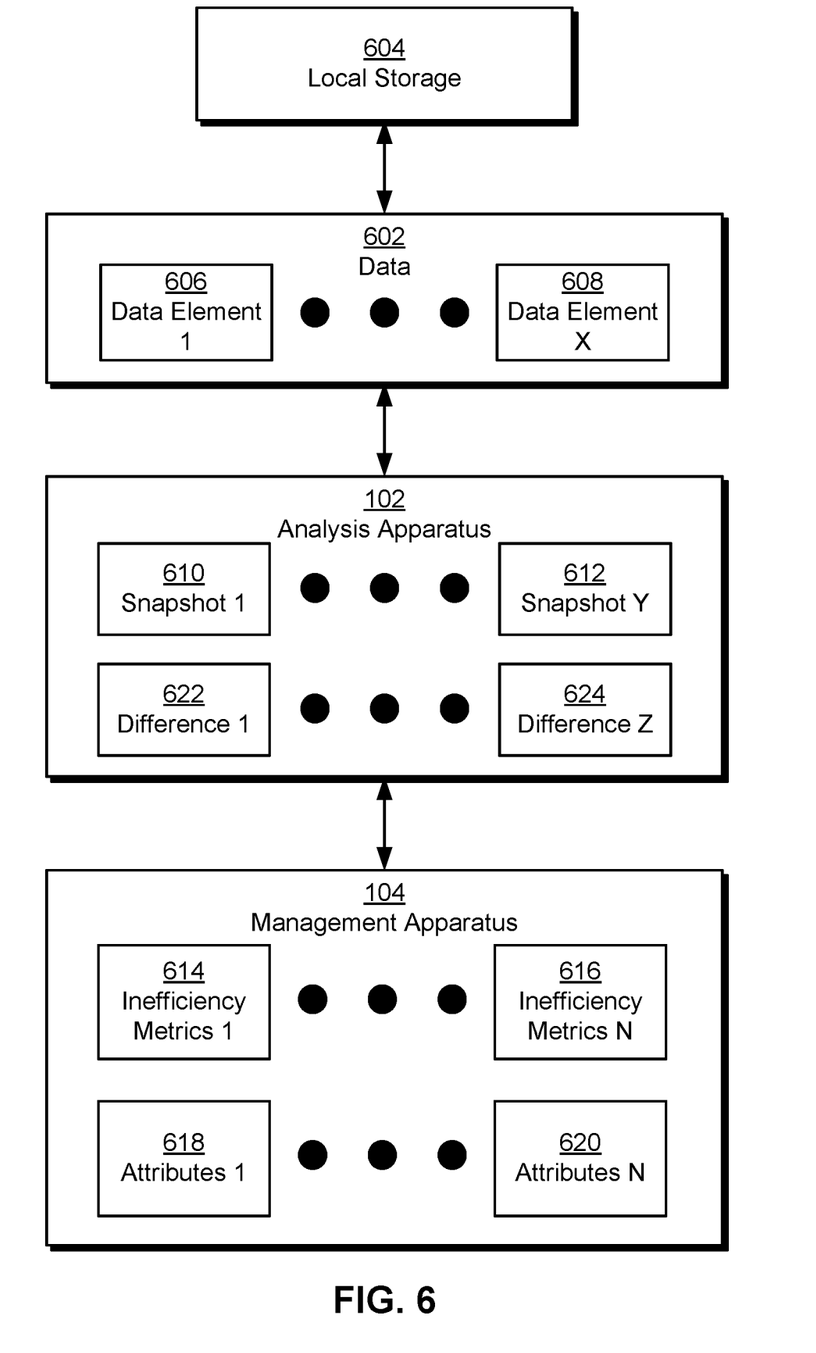
FIG. 6 shows a system for detecting inefficiencies in local storage on a computer system in accordance with the disclosed embodiments.

As shown in FIG. 6, analysis apparatus 102 and management apparatus 104 may additionally, or alternatively, be configured to assess inefficiencies in local storage 604 of a computer system, portable electronic device, peripheral device, and/or other computing device. Local storage 604 may include one or more hard disk drives (HDDs), solid-state drives (SSDs), optical drives, tape drives, and/or other types of nonvolatile storage in the computing device. Data 602 stored in local storage 604 may include a number of data elements (e.g., data element 1 606, data element x 608) such as files, directories, database records, logs, read operations, and/or write operations.

First, analysis apparatus 102 may obtain a series of snapshots (e.g., snapshot 1 610, snapshot y 612) of data 602 in local storage 604. Each snapshot may include a representation of the data found in some or all of local storage 604 at a given time. For example, the snapshot may include a disk image of a data storage device in local storage 604, one or more partitions in the data storage device, one or more directories in the data storage device, and/or data associated with one or more file or data types of data 602. In a second example, snapshots may be generated for reads, writes, and/or other types of input/output (I/O) operations associated with local storage 604. In a third example, a snapshot of data accessed by a service, executable, or a group of services or executables may be generated by monitoring reads and writes performed by the service(s) or executable(s). As discussed above, the snapshots may be obtained periodically, randomly, and/or after certain events or conditions have occurred.

Analysis apparatus 102 may also calculate a difference (e.g., difference 1 622, difference z 624) between pairs of consecutive and/or non-consecutive snapshots. Each difference may include changes to the data between two snapshots and/or portions of the snapshots. For example, the difference may identify additions, deletions, and/or modifications to files, directories, records, logs, blocks, sectors, certain file types, certain data types, and/or other data elements in local storage 604.

Next, analysis apparatus 102 may use one or more compression techniques to generate a set of inefficiency metrics (e.g. inefficiency metrics 1 614, inefficiency metrics n 616)

for data elements in each snapshot and/or from a difference between two snapshots. As previously mentioned, analysis apparatus 102 may group and/or filter the data in a given snapshot or difference before compressing the data and calculating a redundancy, compression ratio, and/or other measure of inefficiency from the compressed and uncompressed sizes of the data. For example, analysis apparatus 102 may group or filter data in the snapshot or difference by attributes such as file type, data type, directory, data storage device, service or operation (e.g., read, write, etc.), and/or executable used to create, access, or modify the data before compressing the data.

Analysis apparatus 102 may also adjust the interval between two snapshots from which a difference is calculated based on existing inefficiency metrics for snapshots and/or differences calculated from the snapshots. For example, analysis apparatus 102 may initially calculate and analyze inefficiency metrics for snapshots that are separated by periodic intervals (e.g., hourly, daily, etc.) and/or differences calculated from consecutive or non-consecutive snapshots. When a significant level of inefficiency is found in a snapshot and/or difference between two snapshots, analysis apparatus 102 may reduce the interval between subsequent snapshots to better analyze the cause of the inefficiency and/or identify a trend in the inefficiency. Analysis apparatus 102 may continue to decrease the interval between snapshots, generate differences from the snapshots, and/or perform grouping or filtering of data in the snapshots until a source of the inefficiency can be identified.

In addition, analysis apparatus 102 may group, filter, analyze, and/or compress data 602 in local storage 604 in different ways to identify different types of inefficiency in local storage 604. In one example, analysis apparatus 102 may examine differences between snapshots of an entire data storage device over time to identify blocks of data that do not change as evidence of data fragmentation in the data storage device. In another example, analysis apparatus 102 may identify inefficiencies in logging, error reporting, and/or schemas as redundancies in the corresponding logs, error reports, schemas, and/or other data elements in local storage 604. Because such inefficiencies may be represented by reading and/or writing the same data repeatedly, the corresponding logs, error reports, and/or other portions of data 602 associated with the inefficiencies may be increasingly compressible over time. In a third example, analysis apparatus 102 may analyze inefficiencies in read operations (e.g., repeatedly reading from disk instead of memory), write operations (e.g., repeatedly writing the same data to disk), and/or other types of I/O operations by analyzing snapshots or differences of data accessed by the operations.

Finally, management apparatus 104 may output the inefficiency metrics with additional attributes (e.g., attributes 1 618, attributes n 620) of the data elements. For example, management apparatus 104 may display a ranking of data elements and/or groupings of data elements in the snapshot by decreasing order of inefficiency, as determined using the inefficiency metrics. Management apparatus 104 may also display attributes associated with items in the ranking, such as the file names, directories, paths, file or data types, operations, services, executables, data values, and/or other values by which the data elements were grouped or filtered to generate the inefficiency metrics. Management apparatus 104 may further display the types of inefficiencies (e.g., fragmentation, logging, error reporting, schema, I/O, etc.) found in data 602 to facilitate improvement of the inefficiencies by a user of the computing device.

Figure 7:
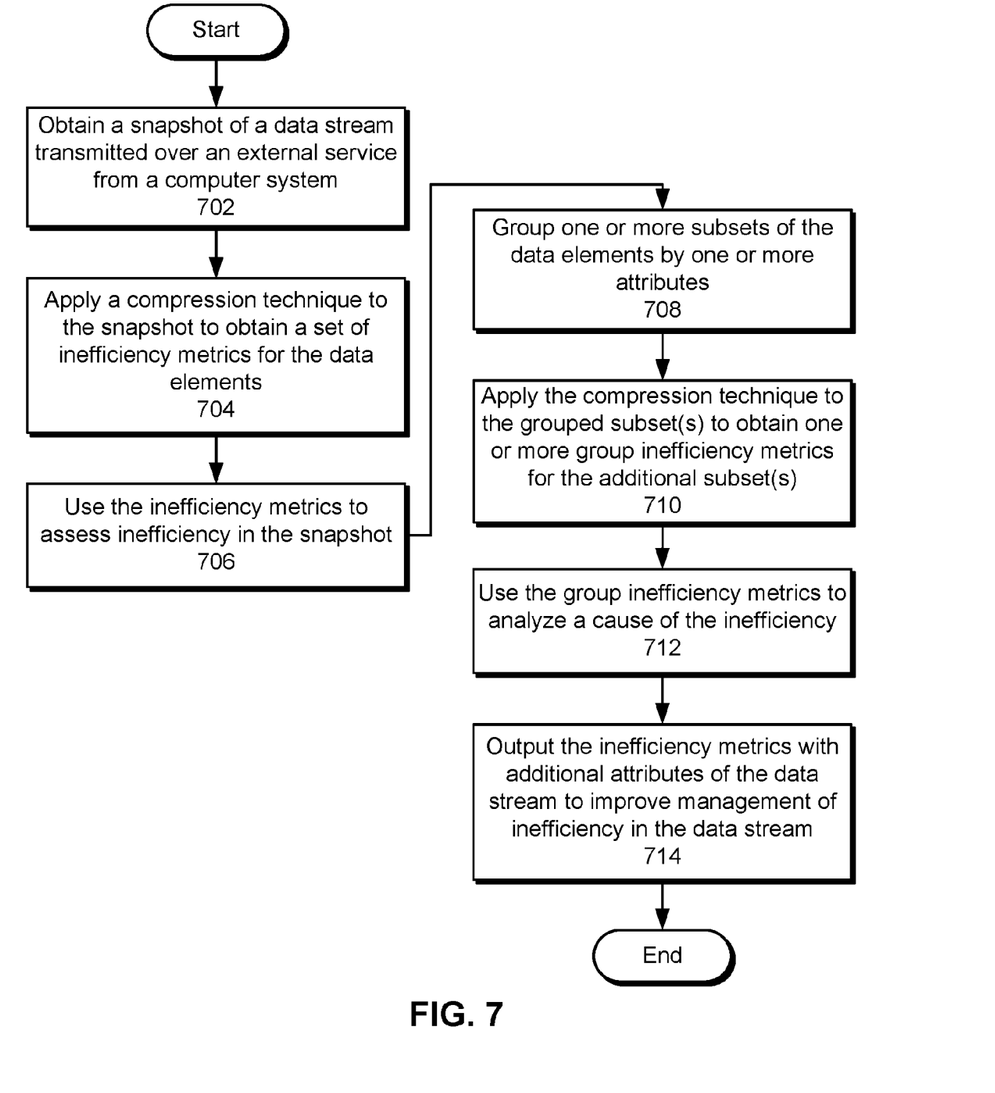
FIG. 7 shows a flowchart illustrating the process of detecting inefficiency in an external service in accordance with the disclosed embodiments.

FIG. 7 shows a flowchart illustrating the process of detecting inefficiency in an external service in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

Initially, a snapshot of a data stream transmitted over or via an external service from a computer system is obtained (operation 702). For example, the snapshot may include packet data and/or other types of data transmitted over a network interface, bus interface, and/or other type of interface between the computer system and another electronic device (e.g., computer system, portable electronic device, peripheral device, etc.). The snapshot may be obtained after an event or condition has occurred, after a fixed interval has passed since a previous snapshot, and/or at a random time. The snapshot may contain a fixed amount of data, a variable amount of data that is collected over a fixed interval, and/or another predefined aggregation of data in the data stream.

Next, a compression technique is applied to the snapshot to obtain a set of inefficiency metrics for the data elements (operation 704). For example, the compression technique may be used to compress the entire snapshot; individual packets, groups of packets, packet headers, and/or packet payloads in the snapshot; and/or other data elements or groups of data elements in the snapshot. The corresponding inefficiency metrics may be calculated by dividing the compressed sizes of the snapshot or portions by the uncompressed sizes.

The inefficiency metrics may thus represent redundancies of various portions of the data stream, which can be used to assess inefficiency in the snapshot (operation 706). For example, inefficiency in the snapshot may be found when a redundancy, compression ratio, and/or other inefficiency metric for the snapshot exceeds a threshold.

During analysis of inefficiency in the data stream, one or more subsets of the data elements are also grouped by one or more attributes (operation 708). For example, the subset(s) may be grouped or filtered by port, service type, protocol, network stack layer, data element type, address, source, and/or destination.

The compression technique is then applied to the subset(s) to obtain one or more group inefficiency metrics for the subset(s) (operation 710), and the group inefficiency metrics are used to analyze a cause of the inefficiency (operation 712). For example, inefficiency in the snapshot may be analyzed by grouping subsets of data elements in the snapshot by various attributes, calculating group inefficiency metrics for the subsets, and using the group inefficiency metrics to identify the "contribution" of the subsets to the inefficiency.

When a subset is determined to contribute significantly to the inefficiency, the subset may be further divided into additional subsets to identify additional factors associated with the inefficiency. For example, high redundancy in packets transmitted over a network connection (e.g., from a source address to a destination address) may be analyzed by grouping the packet data by headers, payloads, protocols, and/or other attributes, compressing the grouped packet data, and comparing the compressed and uncompressed sizes of the data to identify attributes that are common to redundant data in the packets. Thus, one or more types of inefficiency (e.g., request strategy inefficiency, schema inefficiency, security flaw) may be represented by attributes that indicate high redundancy or compressibility in the corresponding subsets of data elements.

Finally, the inefficiency metrics are outputted with additional attributes of the data stream to improve management of inefficiency in the data stream (operation 714). For example, a ranking of various portions of the data stream may be displayed in decreasing order of inefficiency, along with attributes (e.g., protocols, services, applications, ports, addresses, data element types, packet values, etc.) associated with the portions. A subset of the portions may also be identified as candidates for improving the inefficiency. Types of inefficiency found in the data stream may also be included in the displayed attributes to facilitate resolution of the inefficiency.

Figure 8:
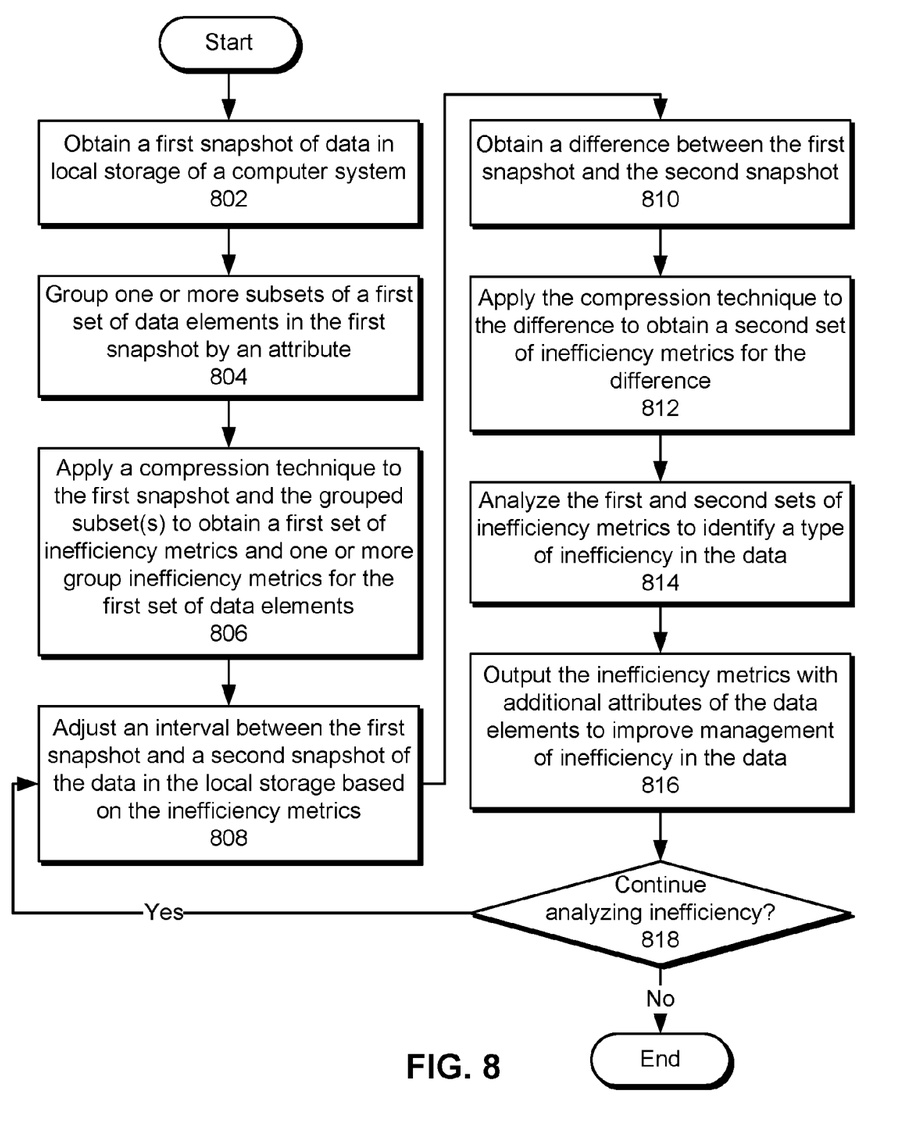
FIG. 8 shows a flowchart illustrating the process of detecting inefficiency in local storage of a computer system in accordance with the disclosed embodiments.

FIG. 8 shows a flowchart illustrating the process of detecting inefficiency in local storage of a computer system in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

Initially, a first snapshot of data in local storage of a computer system is obtained (operation 802). For example, the first snapshot may include a disk image, directory, file, collection of files, and/or one or more I/O operations associated with an HDD, SSD, optical drive, tape drive, and/or other data storage device. Data elements in the first snapshot may include files, logs, records, writes, and/or reads. Next, one or more subsets of a first set of data elements in the first snapshot are grouped by an attribute (operation 804). For example, the subset(s) may be grouped by file name, file type, data type, directory, device, service, executable, and/or other attributes of data elements in the local storage.

A compression technique is then applied to the first snapshot and the grouped subset(s) to obtain a first set of inefficiency metrics and one or more group inefficiency metrics for the first set of data elements (operation 806). The inefficiency metrics may include redundancies, compression ratios, and/or other representations of inefficiency in the corresponding portions of the snapshot.

An interval between the first snapshot and a second snapshot of the data is adjusted based on the inefficiency metrics (operation 808), and a difference between the first and second snapshots is obtained (operation 810). For example, the interval may be selected to be inversely proportional to the inefficiency metrics over previous snapshots and/or differences, such that an increase in inefficiency results in a shorter interval between snapshots. In another example, the interval may be progressively narrowed to "drill down" into a cause of inefficiency in the data once the inefficiency is detected.

The compression technique is applied to the difference to obtain a second set of inefficiency metrics for the difference (operation 812), and the second set of inefficiency metrics is analyzed to identify a type of inefficiency in the data (operation 814). For example, the first and second sets of inefficiency metrics may be used to identify redundancies in the data and/or I/O operations associated with the data. In turn, inefficiency metrics for various groupings of data, snapshots, and/or differences between snapshots may be used to identify data fragmentation, logging inefficiencies, I/O inefficiencies, schema inefficiencies, and/or other types of inefficiency in the local storage.

The calculated inefficiency metrics are then outputted with additional attributes of the data elements to improve management of inefficiency in the data (operation 816). For example, a ranking of the data elements and/or groupings may be displayed in decreasing order of inefficiency, along with attributes associated with the data elements and/or groupings. To further improve management of inefficiency in the data, the types of inefficiency found in the data may be included in the attributes that are outputted with the inefficiency metrics.

Inefficiency may continue to be analyzed (operation 818) using the first snapshot. If the inefficiency is to be analyzed, the interval between the first snapshot and another snapshot is adjusted based on existing inefficiency metrics (operation 808), and inefficiency metrics are obtained for a difference between the two snapshots (operations 810-812). The inefficiency metrics are then analyzed to identify the types of inefficiency in the data (operation 814), and the inefficiency metrics and associated attributes and/or inefficiency types are outputted (operation 816). Analyzing inefficiency using the first snapshot may thus continue until the types and/or causes of inefficiency associated with the first snapshot are identified and/or resolved.

Figure 9:
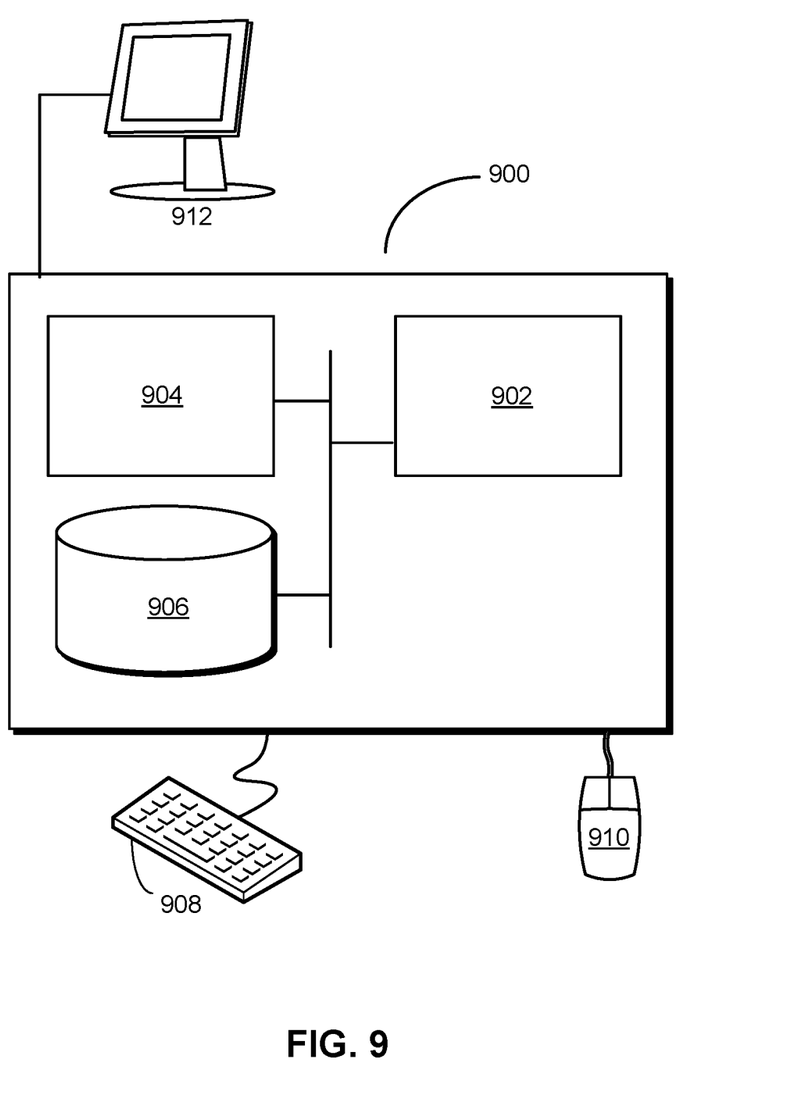
FIG. 9 shows a computer system in accordance with the disclosed embodiments.

FIG. 9 shows a computer system 900 in accordance with an embodiment. Computer system 900 may correspond to an apparatus that includes a processor 902, memory 904, storage 906, and/or other components found in electronic computing devices. Processor 902 may support parallel processing and/or multi-threaded operation with other processors in computer system 900. Computer system 900 may also include input/output (I/O) devices such as a keyboard 908, a mouse 910, and a display 912.

Computer system 900 may include functionality to execute various components of the present embodiments. In particular, computer system 900 may include an operating system (not shown) that coordinates the use of hardware and software resources on computer system 900, as well as one or more applications that perform specialized tasks for the user. To perform tasks for the user, applications may obtain the use of hardware resources on computer system 900 from the operating system, as well as interact with the user through a hardware and/or software framework provided by the operating system.

In one or more embodiments, computer system 900 provides a system for detecting and managing inefficiency in external services. The system may include an analysis apparatus that obtains a snapshot of a data stream transmitted over an external service (e.g., network service, interconnect service, etc.) from a computer system at a first time. Next, the analysis apparatus may apply a compression technique to the snapshot to obtain a set of inefficiency metrics for a set of data elements (e.g., network packets, data packets, non-packet data, etc.) in the snapshot. The system may also include a management apparatus that outputs the set of inefficiency metrics with additional attributes of the data stream to improve identification of inefficiency in the data stream.

The analysis apparatus and management apparatus may also, or instead, be configured to detect and manage inefficiency in local storage of a computer system. The analysis apparatus may obtain a first snapshot of data in the local storage and apply a compression technique to the first snapshot to obtain a first set of inefficiency metrics for the first set of data elements. The analysis apparatus may also obtain a difference between the first snapshot and a second snapshot of the data in the local storage and apply a compression technique to the difference to obtain a second set of inefficiency metrics for the difference. The analysis apparatus may then analyze the first and second sets of inefficiency metrics to identify a type of inefficiency in the data. Finally, the management apparatus may output the inefficiency metrics with additional attributes of the data to improve management of inefficiency in the data.

In addition, one or more components of computer system 900 may be remotely located and connected to the other components over a network. Portions of the present embodiments (e.g., analysis apparatus, management apparatus, etc.) may also be located on different nodes of a distributed system that implements the embodiments. For example, the present embodiments may be implemented using a cloud computing system that analyzes snapshots of data from remote computer systems to detect inefficiencies trends, and/or issues in local storage and/or external services associated with the remote computer systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a first snapshot of data in local storage of a computer system, wherein the first snapshot comprises a first set of data elements in the local storage at a first time;
   applying, by a processor, a compression technique to the first snapshot to obtain a first set of inefficiency metrics for the first set of data elements;
   outputting the first set of inefficiency metrics with additional attributes of the data to improve management of inefficiency in the data;
   obtaining a difference between the first snapshot and a second snapshot of the data in the local storage, wherein the second snapshot comprises a second set of data elements in the local storage at a second time;
   applying the compression technique to the difference to obtain a second set of inefficiency metrics for the difference; and
   analyzing the first and second sets of inefficiency metrics to identify a type of inefficiency in the data.

2. The method of claim 1, further comprising:
   grouping a subset of the first set of data elements by an attribute;
   applying the compression technique to the grouped subset to obtain a group inefficiency metric for the grouped subset; and
   including the group inefficiency metric in the outputted first set of inefficiency metrics.

3. The method of claim 2, wherein the attribute comprises at least one of:
   a file name;
   a file type;
   a data type;
   a directory;
   a device;
   a service; and
   an executable.

4. The method of claim 1, further comprising:
   adjusting an interval between the first and second snapshots based on the first or second sets of inefficiency metrics.

5. The method of claim 1, wherein the type of inefficiency is at least one of:
   data fragmentation;
   a logging inefficiency;
   an input/output (I/O) inefficiency; and
   a schema inefficiency.

6. The method of claim 1, wherein the first set of data elements comprises at least one of:
   a file;
   a log;
   a record;
   a write; and
   a read.

7. The method of claim 1, wherein the local storage is at least one of:
   a hard disk drive (HDD);
   a solid-state drive;
   an optical drive; and
   a tape drive.

8. The method of claim 1, wherein the set of inefficiency metrics comprises at least one of:
   a redundancy; and
   a compression ratio.

9. The method of claim 1, wherein outputting the first set of inefficiency metrics with the additional attributes of the first set of data elements comprises at least one of:
   displaying a ranking of the first set of data elements by the first set of inefficiency metrics; and
   identifying a subset of the first set of data elements as candidates for improving the inefficiency.

10. An apparatus, comprising:
    one or more processors; and
    memory storing instructions that, when executed by the one or more processors, cause the apparatus to:
       obtain a first snapshot of data in local storage of a computer system, wherein the first snapshot comprises a first set of data elements in the local storage at a first time;
       apply a compression technique to the first snapshot to obtain a first set of inefficiency metrics for the first set of data elements;
       output the first set of inefficiency metrics with additional attributes of the data to improve management of inefficiency in the data;
       obtain a difference between the first snapshot and a second snapshot of the data in the local storage, wherein the second snapshot comprises a second set of data elements in the local storage at a second time;
       apply the compression technique to the difference to obtain a second set of inefficiency metrics for the difference; and
       analyze the first and second sets of inefficiency metrics to identify a type of inefficiency in the data.

11. The apparatus of claim 10, wherein the memory further stores instructions that, when executed by the one or more processors, cause the apparatus to:
    group a subset of the first set of data elements by an attribute;
    apply the compression technique to the grouped subset to obtain a group inefficiency metric for the grouped subset; and
    include the group inefficiency metric in the outputted first set of inefficiency metrics.

12. The apparatus of claim 11, wherein the attribute comprises at least one of:
    a file name;
    a file type;
    a data type;
    a directory;
    a device;
    a service; and
    an executable.

13. The apparatus of claim 10, wherein the memory further stores instructions that, when executed by the one or more processors, cause the apparatus to:
adjust an interval between the first and second snapshots based on the first or second sets of inefficiency metrics.

14. The apparatus of claim 10, wherein the type of inefficiency is at least one of:
data fragmentation;
a logging inefficiency;
an input/output (I/O) inefficiency; and
a schema inefficiency.

15. The apparatus of claim 10, wherein the first set of data elements comprises at least one of:
a file;
a log;
a record;
a write; and
a read.

16. A system, comprising:
an analysis module comprising a non-transitory computer-readable medium storing computer-executable instructions that, when executed by the system, cause the system to:
obtain a first snapshot of data in local storage of a computer system, wherein the first snapshot comprises a first set of data elements in the local storage at a first time;
apply a compression technique to the first snapshot to obtain a first set of inefficiency metrics for the first set of data elements;
obtain a difference between the first snapshot and a second snapshot of the data in the local storage, wherein the second snapshot comprises a second set of data elements in the local storage at a second time;
apply the compression technique to the difference to obtain a second set of inefficiency metrics for the difference; and
analyze the first and second sets of inefficiency metrics to identify a type of inefficiency in the data; and
a management module comprising a non-transitory computer-readable medium storing instructions that, when executed, cause the system to output the first set of inefficiency metrics with additional attributes of the data to improve management of inefficiency in the data.

17. The system of claim 16, wherein the non-transitory computer-readable medium of the analysis module further stores computer-executable instructions that, when executed by the system, cause the system to:
adjust an interval between the first and second snapshots based on the first or second sets of inefficiency metrics.

18. The method of claim 4, further comprising:
repeating the adjusting of the interval between the first and second snapshots based on the first or second sets of inefficiency metrics, until a source of inefficiency is identified.

19. The apparatus of claim 13, wherein the memory further stores instructions that, when executed by the one or more processors, cause the apparatus to:
repeat the adjusting of the interval between the first and second snapshots based on the first or second sets of inefficiency metrics, until a source of inefficiency is identified.

20. The system of claim 17, wherein the non-transitory computer-readable medium of the analysis module further stores computer-executable instructions that, when executed by the system, cause the system to:
repeat the adjusting of the interval between the first and second snapshots based on the first or second sets of inefficiency metrics, until a source of inefficiency is identified.

* * * * *